Patented Aug. 13, 1940

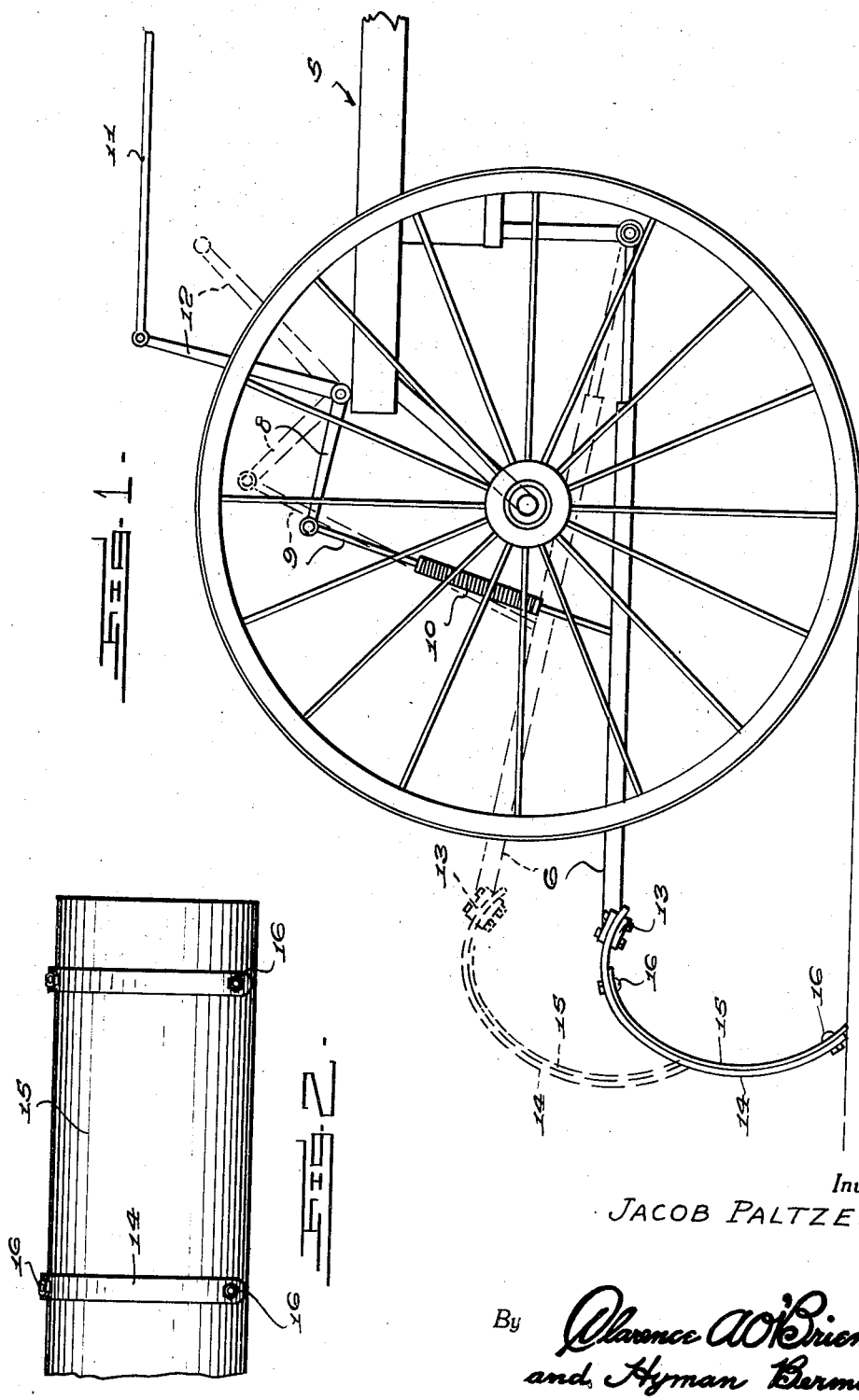

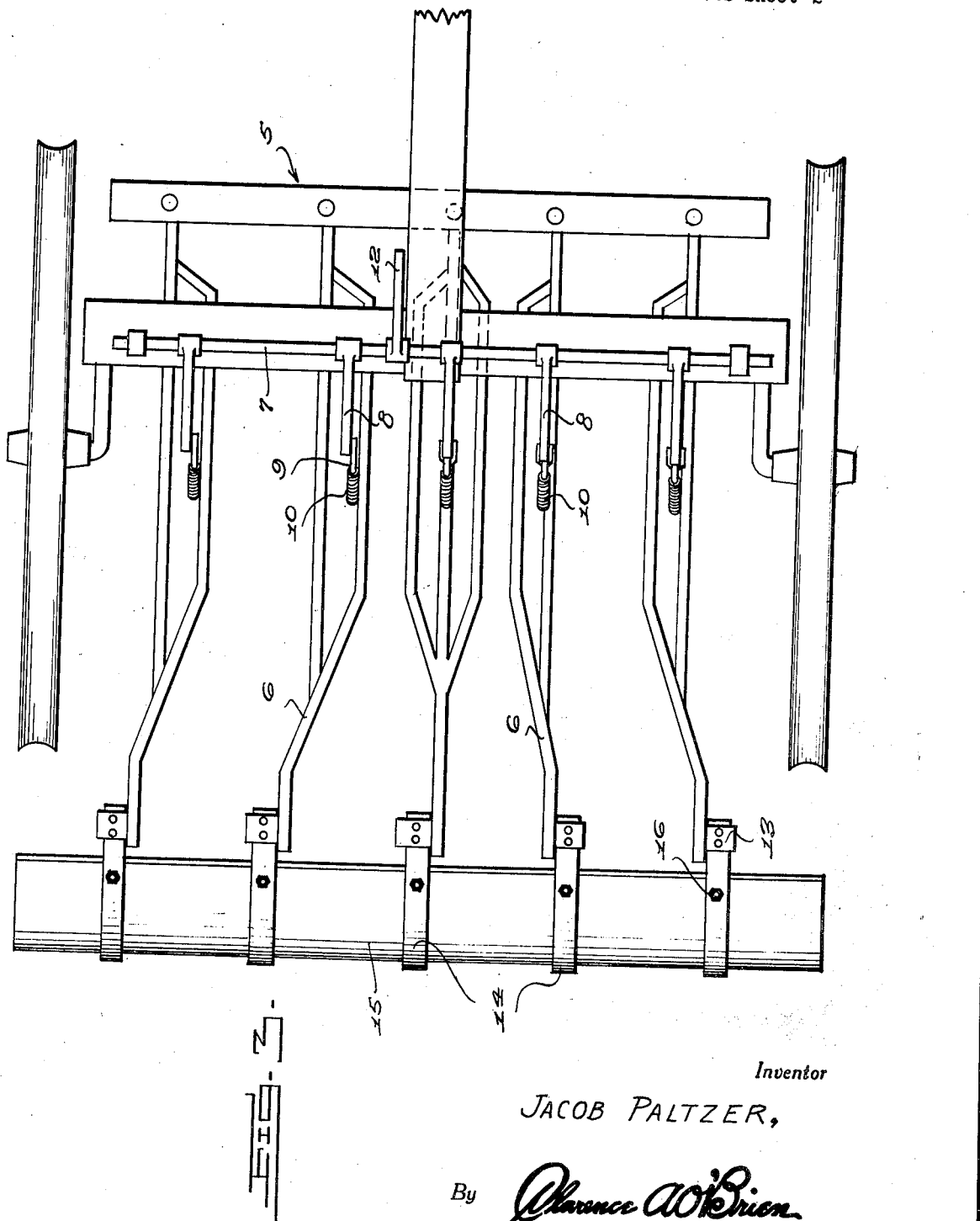

2,211,157

UNITED STATES PATENT OFFICE 2,211,157

BLADE ATTACHMENT FOR QUACK DIGGERS

Jacob Paltzer, Appleton, Wis.

Application January 3, 1939, Serial No. 249,097

1 Claim. (Cl. 97—144.1)

This invention relates broadly to attachments for machines known in the art as "quack roots diggers" and more particularly to an attachment therefor.

The present invention is a grader or scraper blade adapted to be readily attached to the teeth of a quack grass or root digger for use in digging ditches, levelling off uneven land surface, grading down side hills, filling up cat holes, and to assist in wholly separating or digging up the quack roots from the ground as may be found desirable.

The invention together with its objects and advantages will be best understood from a study of the following description taken in connection with the accompanying drawings wherein:

Figure 1 is a fragmentary side elevational view of a quack grass digger having my blade attachment associated therewith.

Figure 2 is a fragmentary elevational view showing the blade as attached to the teeth of the digger, and Figure 3 is a fragmentary top plan view of a quack grass digger showing the blade associated therewith.

Referring more in detail to the drawings it will be seen that 5 indicates generally a conventional quack grass digger, the same embodying among other parts a plurality of pivotally mounted beams 6 which are arranged for vertical swinging movement and are adapted to be swung vertically to the desired position of adjustment through the medium of a rock shaft 7 suitably journaled on the frame of the machine and equipped with arms 8 pivotally connected to the beams 6 through the medium of links 9. Also, as is conventional, each link 9 has as a part thereof a coil spring 10.

For rocking the shaft 7 there is provided the usual detent-equipped hand lever (not shown) the same, as is also conventional, being connected with the rock shaft 7 through the medium of a push and pull link or rod 11 that in turn is pivoted to an arm 12 provided on the shaft 7.

Further, and as is conventional, the beams 6 have suitably and detachably secured to the free ends thereof as at 13 the curved digging tools or teeth 14.

In accordance with the present invention there is provided an elongated blade 15 that is transversely curved as shown so as to fit conformably within the concaves of the teeth 14, or as may be found desirable to receive within the concave thereof the curved teeth 14.

The teeth 14 are provided adjacent the upper and lower ends thereof with apertures to accommodate nut-equipped bolts 16 through the medium of which the blade 15 is in a positive yet detachable manner secured to the teeth.

It will be apparent that with the blade 15 thus secured to the teeth either at the concave or convex side of the teeth said blade may be used as a scraper or grader blade for use in digging ditches, levelling off uneven land surface, grading down side hills, filling up cat holes, to assist in separating the roots of the quack grass from the soil, or for gathering dirt or the like into piles as may be found desirable.

It is also apparent that the blade so secured to the digging teeth 14 the blade 15 may be raised or lowered incidental to a vertical swinging movement of the beams 6 as also may be found desirable.

It is thought that a clear understanding of the construction, utility and advantages of an invention of this character will be had without a more detailed description.

Having thus described the invention what is claimed as new is:

In combination with a quack grass digger including a plurality of pivotally mounted beams and digging teeth fixedly secured to said beams, of a scraper blade arranged to extend transversely with respect to the digger, and means positively securing the blade to the digging teeth, said blade being of a transverse curvature to correspond to the conventional curvature of the digging teeth one face of the blade having portions snugly contacting faces of the teeth with the lower edge of the blade slightly projecting below the lower ends of the teeth and said securing means consisting of upper and lower bolts passing through upper and lower portions of the blade and through upper and lower portions of the teeth.

JACOB PALTZER.